(12) United States Patent
Manakkattupadeettathil

(10) Patent No.: US 8,516,812 B2
(45) Date of Patent: Aug. 27, 2013

(54) POWER PRODUCTION EMPLOYING BUOYANCY, GRAVITY AND KINETIC ENERGY

(76) Inventor: David Chacko Manakkattupadeettathil, Bahrain (BH)

( * ) Notice: Subject to any disclaimer, the term of this patent is extended or adjusted under 35 U.S.C. 154(b) by 821 days.

(21) Appl. No.: 12/748,556

(22) Filed: Mar. 29, 2010

(65) Prior Publication Data

US 2010/0180587 A1    Jul. 22, 2010

Related U.S. Application Data

(63) Continuation-in-part of application No. PCT/IN2009/000049, filed on Jan. 20, 2009.

(30) Foreign Application Priority Data

Feb. 14, 2008    (IN) .............................. 371/CHE/2008

(51) Int. Cl.
*F03C 1/00* (2006.01)
*H02P 9/04* (2006.01)

(52) U.S. Cl.
USPC ................................ 60/495; 60/496; 290/1 R

(58) Field of Classification Search
USPC ............ 60/495–507; 290/1 R, 42, 43, 52–55
See application file for complete search history.

(56) References Cited

U.S. PATENT DOCUMENTS

| | | | |
|---|---|---|---|
| 3,194,008 A | | 7/1965 | Baumgartner |
| 3,412,482 A | | 11/1968 | Kusmer |
| 3,857,242 A | * | 12/1974 | Gilmore .......................... 60/495 |
| 4,074,526 A | * | 2/1978 | West ................................ 60/325 |
| 4,538,415 A | * | 9/1985 | Lebecque ....................... 60/639 |
| 4,718,232 A | | 1/1988 | Willmouth |
| 5,905,312 A | | 5/1999 | Liou |
| 6,249,057 B1 | * | 6/2001 | Lehet ............................. 290/1 R |
| 6,817,180 B2 | * | 11/2004 | Newman ......................... 60/639 |
| 7,134,283 B2 | * | 11/2006 | Villalobos ....................... 60/639 |
| 8,171,729 B2 | * | 5/2012 | O'Briant ......................... 60/495 |

FOREIGN PATENT DOCUMENTS

| | | |
|---|---|---|
| ES | 2160029 B1 | 10/2001 |
| GB | 2421768 A | 7/2006 |
| IN | 371/CHE/2008 A1 | 2/2008 |
| JP | 10141204 A | 5/1998 |
| JP | 2002138944 A | 5/2002 |
| WO | WO9631696 A1 | 10/1996 |
| WO | WO2007/007114 A1 | 1/2007 |
| WO | PCT/IN2009/000049 A1 | 1/2009 |

OTHER PUBLICATIONS

European Patent Office, International Search Report, PCT/IN2009/000049 (parent application), Rijswijk, Netherlands.

* cited by examiner

*Primary Examiner* — Hoang Nguyen
(74) *Attorney, Agent, or Firm* — Louis Ventre, Jr.

(57) ABSTRACT

An apparatus for the production of energy includes a vertical pipe filled with a liquid. A second similar pipe is connected to the first pipe near its top end above the top of the liquid. Hollow spheres each fit within the first pipe and float. This second pipe allows downward passage of spheres lifted into the second pipe by a sphere-lifting mechanism. A platform close the bottom of the apparatus sits in a position to be impacted by the sphere. The platform moves in response to the impact and is brought to a stop and then returned by spring action. A rotatable flywheel turns with movement of the platform. A sphere injector then injects a sphere into the first pipe and it floats to the top by its buoyancy.

10 Claims, 7 Drawing Sheets

POWER PRODUCTION EMPLOYING BUOYANCY, GRAVITY AND KINETIC ENERGY

CROSS-REFERENCE TO RELATED APPLICATIONS

This application is a continuation-in-part of International Application No. PCT/IN2009/000049, filed 20 Jan. 2009, which claims priority to Indian patent application 371/CHE/2008, filed 14 Feb. 2008, which are hereby incorporated by reference herein.

TECHNICAL FIELD

In the field of power production, an apparatus having a working member which is buoyant in a fluid with the member having a vertical component of motion and thereby adapted to do work through a mechanical output means employing kinetic energy due to the pull of gravity.

BACKGROUND ART

Machines that utilize buoyancy and gravity to generate power have been described. For example, the U.S. Pat. No. 4,718,232 titled "Gravity and buoyancy driven power generators," teaches an apparatus with a long chain having an attached hollow body that passes through a rotating sprocket, which generates electrical power.

Another patent titled "gravity generating system" (U.S. Pat. No. 5,905,312) teaches a system that includes a plurality of tanks mounted on a circulating device. When the tanks receive the working medium descending from a higher place elevation, the circulating device is driven to circulate among a guidance device so as to drive a working shaft of a generator to produce electricity. A transmission mechanism is added between the circulating device and the working shaft to increase the rotational speed of the working shaft.

U.S. Pat. No. 3,412,482 discloses a buoyancy demonstrating apparatus wherein a plurality of expansible and compressible gas chambers is provided around the periphery of an endless carrier that is immersed in water.

U.S. Pat. No. 3,194,008 is for a "positive buoyancy prime mover" employing a device is submerged in a liquid and harnessing rotary motion derived from the buoyancy of a plurality of balls mounted at the end of spokes extending out from a central hub.

International application Publication No. WO2007007114A1 teaches buoyant systems in which objects are raised to an elevated height by buoyancy in a liquid and are then transferred to a receiving device operable to lower the objects by the force of gravity. The receiving device is provided with a power-take off device for generating electricity or operating mechanical devices. The objects are introduced into a depressurized air lock chamber and a pressuring gas introduced to equalize the pressures in the air lock chamber and a pressure chamber communicating with the lower end of the tower such that the objects are inserted into the lower end of the tower via the pressure chamber. In this case, the function is achieved by a chain and pressure air lock chamber.

SUMMARY OF INVENTION

An apparatus is usable for the production of energy by employing buoyancy, gravity, potential energy, and kinetic energy. A vertical first pipe is approximately filled with a liquid. A second pipe is connected to the first pipe near its top end above the top of the liquid. Hollow spheres each fit within the first pipe and each floats in the liquid. A sphere is lifted into the second pipe by a sphere-lifting mechanism. This second pipe allows downward passage of the sphere. A platform near the bottom sits in a position to be impacted by any sphere exiting the second pipe. The platform moves in response to the impact and is brought to a stop and then returned by spring action to the original position after such movement. A rotatable flywheel is connected to the platform to rotate with movement of the platform. A sphere injector then injects a sphere into the first pipe and it floats to the top by the buoyant force acting on the sphere.

The sphere lifting mechanism may include a pulley-disk with radially-extending arm; a rotator mechanism; and, a rope connected between the pulley disk with radially-extending arm and the rotator mechanism.

Ropes may also be connected: between the platform and the rotatable flywheel and between the rope-winding mechanism and the platform. The ropes enable coordinated operability of the components connected by the ropes. A kinetics mechanism may be used to collect spheres after impact with the platform and it includes two vertical co-axial hollow tubular members with downward movement of the inside tubular member resisted by a spring. A hard rubber ball positioned at the top of the inside tubular member. The spring and the hard rubber ball aid in cushioning forces from stopping the platform. A net directs the rebounding sphere into a sphere-sliding pipe sending the sphere to the sphere injector.

The sphere injector includes a ball-valve in which a sphere enters in a downwardly slanting chamber configured to rotate to connect with either the position of the sphere-sliding pipe or an entry position to the first pipe. An actuator for the ball-valve turns it between positions.

The sphere-lifting mechanism may include a tank and a pulley-disk with a radially-extending arm. The pulley-disk rotates its radially-extending arm into the first pipe to engage the sphere and move it into the second pipe. A rotator mechanism engages a rope connected with the pulley-disk to rotate the pulley-disk.

A sphere injector alternative includes a U-shaped pipe connecting the sphere-sliding pipe and the first pipe. Two valves are positioned one above the other in the vertical arm of the U-shaped pipe connected to the first pipe. One of these opens and the other closes to regulate the flow of spheres into the first pipe.

A second sphere injector alternative includes a sphere-sliding pipe having an approximate horizontal segment flowably connected to the first pipe. A flap, which is preferably biased in the closed position by a spring, opens and closes access to the first pipe. A valve within the horizontal segment seals off a sphere in the horizontal segment and prevents back flow of the liquid from the first pipe. A rod is operable to push the sphere through the valve and into the first pipe.

Technical Problem

Despite an urgent need for clean electricity production technologies, none of the traditional methods for generating electricity is entirely free from pollution.

Even though, the prior art literature describes various systems/mechanisms that use buoyancy and gravity forces to generate electricity, these have either constructional complexity, limit the usable energy obtainable from the design, or involve physical constraints that complicate construction and maintenance of the system. As a result, the prior art systems are rarely translated into economically viable methods for electric power production.

Solution to Problem

The solution lies in the production of electricity employing gravitation and buoyancy using simple to construct systems that maximize the usable energy obtainable and involve components that can be easily maintained.

The present invention may be used for generating electricity, can be readily assembled or integrated anywhere on the earth without the need for extensive and sophisticated infrastructure or expertise, and is pollution free in its operation, meeting the most stringent of eco-friendly standards followed anywhere in the world.

Advantageous Effects of Invention

The invention as an alternative to hydroelectric power generation and may be used to generate energy in a relatively pollution free environment. It provides a mechanism for tapping the potential gravitational energy stored in an object, in this case a sphere, raised to a height above the ground. The potential energy is converted to kinetic energy by allowing the sphere to fall and strike a platform which converts the kinetic energy to rotational energy in a flywheel and optionally, then to electrical energy using a generator.

A hydro-plant employs a continuous flow of water from a reservoir that is at a height above ground or sea level. When a mass of water leaving the reservoir flows down from a height at which it is stored, it turns a turbine blade which turns a generator to produce electricity. But, when the mass of water and its height are limited, the only way to get continuous energy output is the repeated use of same mass again and again.

According to laws of physics, the amount of energy required to raise an object having a mass to a height is equal to the product of mass times the acceleration due to gravity times the height. A significant advantage of the present invention is the repeated use of the same mass, a sphere, delivered to a height by buoyancy and allowed to fall and accelerate due to gravity to convert the sphere's potential energy to kinetic energy. Buoyancy is achieved by having the weight of the sphere be less than the weight of a volume of liquid displaced by the volume of the sphere in accordance with Archimedes' principle. When that happens, the sphere rises in the liquid due to its buoyancy.

According to the preferred embodiments of the present invention, the apparatus converts the kinetic energy of a falling sphere by impacting the sphere on a movable platform. Movement of the platform creates rotational energy stored in a flywheel, which may be used to turn a generator for electric power generation.

BRIEF DESCRIPTION OF DRAWINGS

The drawings show preferred embodiments of the invention and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
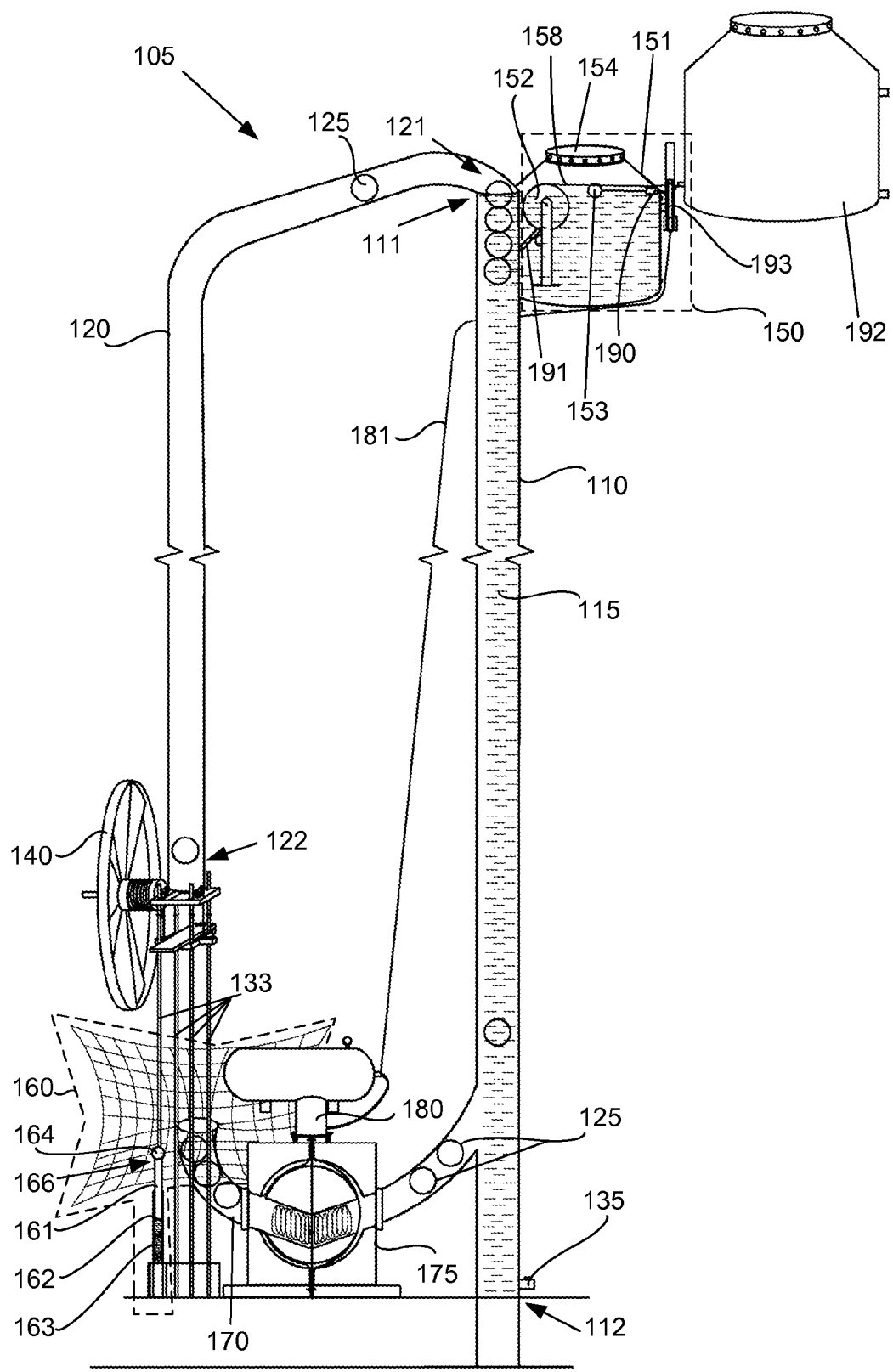
FIG. 1 is a front sectional elevation view of the invention.

FIG. 1 illustrates a preferred embodiment of the invention, which is an apparatus (105) for the production of energy employing buoyancy, gravity and kinetic energy. The apparatus includes: a first pipe (110), a liquid (115), spheres (125), a second pipe (120), a platform (330), a rotatable flywheel (140), a sphere injector (245), and, a sphere-lifting mechanism (150), each of which is now further explained.

The apparatus (105) includes a first pipe (110) comprising a top end (111) and a bottom end (112), and configured approximately vertically with the top end (111) at a height above ground level.

The apparatus (105) next includes a liquid (115) filling the first pipe (110). The liquid (115) is preferably water, but any liquid may be used with denser liquids offering more buoyant force for a given volume in accordance with Archimedes' principle.

The apparatus (105) next includes spheres (125) each of which is hollow and configured to fit within the first pipe (110). Each of the spheres (125) is configured to have a weight less than the weight of a volume of the liquid (115) displaced by a sphere when the sphere is submerged within the liquid (115). Preferably, each of the spheres (125) has a diameter less than the diameter of the first pipe (110) with enough clearance to allow one or more of the plurality of spheres (125) to rise unimpeded within the first pipe (110). Thus, the diameter of the first pipe (110) is preferably large enough to accommodate one sphere at any given level.

The apparatus (105) next includes a second pipe (120) comprising an inbound end (121) and an outbound end (122). The inbound end (121) is flowably connected to the first pipe (110) near the top end (111) of the first pipe (110). The flowable connection allows passage of a sphere from the first pipe (110) to the second pipe (120). The outbound end (122) is configured to allow downward passage of each of the spheres (125) through the second pipe (120) to exit the outbound end (122).

The apparatus (105) next includes a platform (330) comprising an approximately planar surface (331). The platform (330) is configured in an original position (332) to be impacted on the approximately planar surface (330) by each of the spheres (125) exiting the outbound end (122) of the second pipe (120). The original position is preferably determined by stoppers placed on one or more of the four shafts (133) to limit the upward movement of the platform (330). The platform (330) is further configured for movement in response to the impact of a sphere. The platform (330) is further configured to stop and then return by spring action to the original position after such movement.

Figure 3:
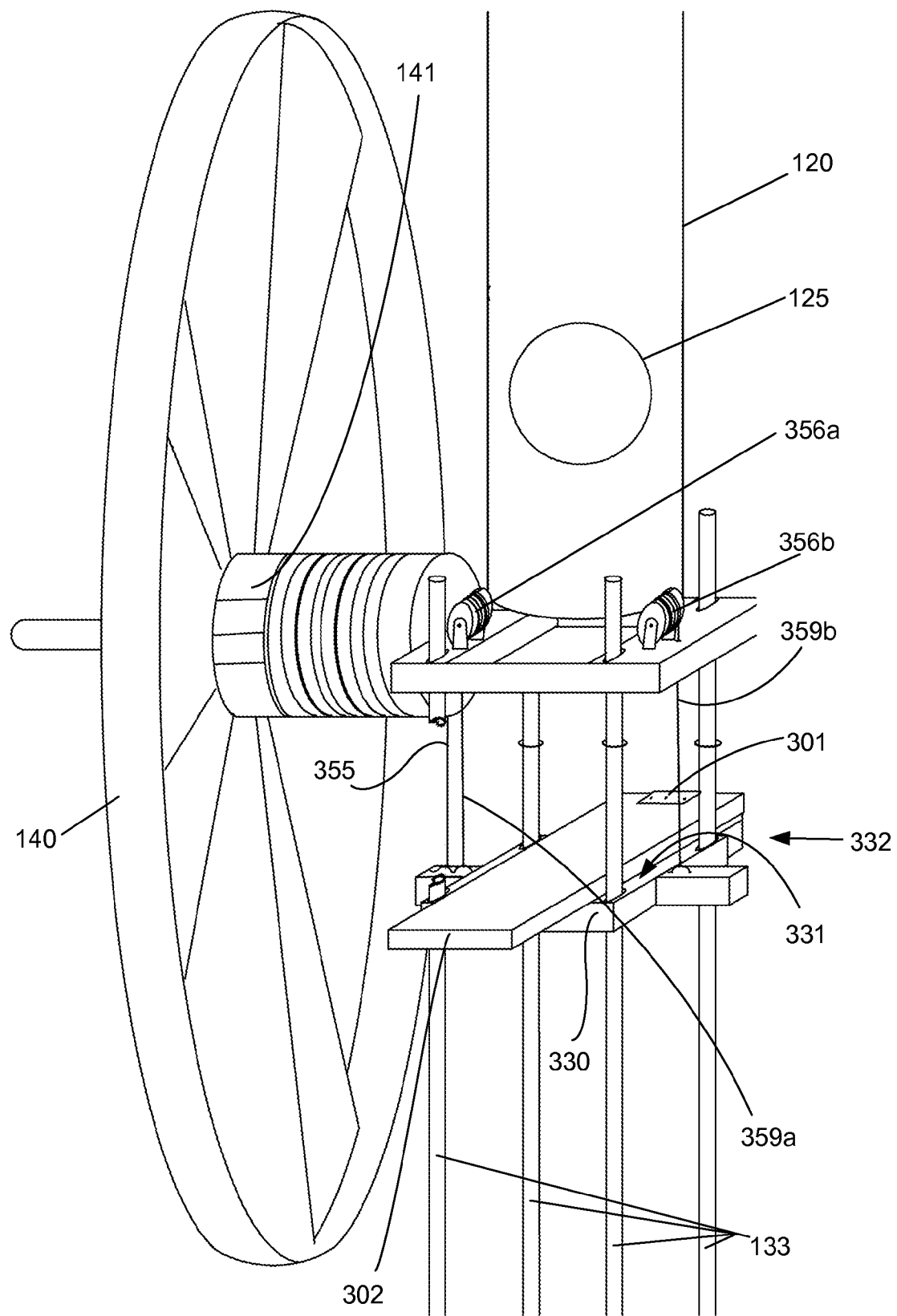
FIG. 3 is a perspective view of rotatable flywheel and rope-winding mechanism.
Figure 4:
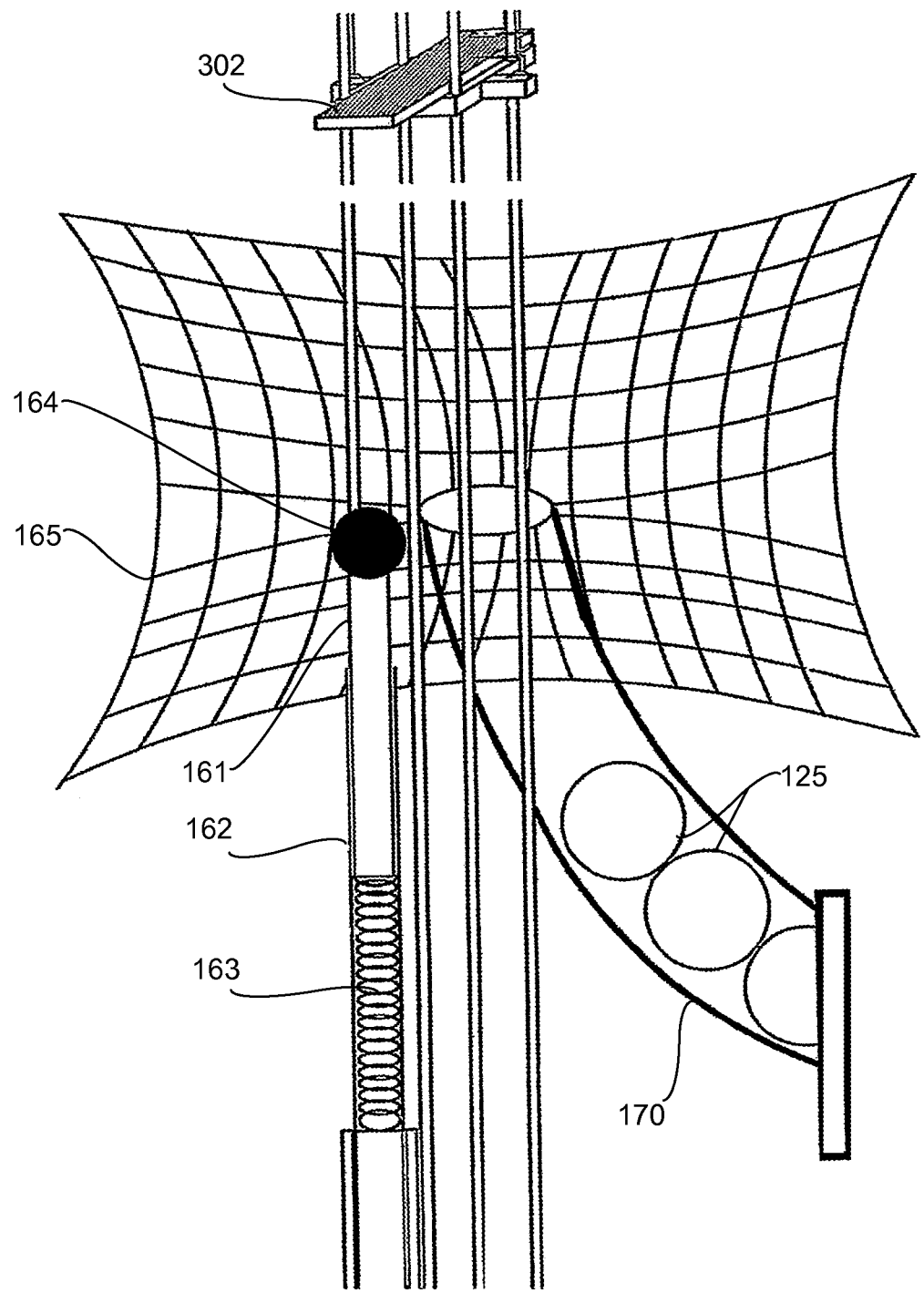
FIG. 4 is a front sectional elevation view of the kinetics mechanism.

As shown in FIG. 1, FIG. 3 and FIG. 4, the platform (330) preferably moves up and down freely guided by four shafts (133), preferably assembled and erected to enable up and down movement of the platform (330).

The platform (330) optionally comprises a spring hinge (333) at one end to tilt a striking platform (302) up when it hits a hard rubber ball (164) that is part of an optional kinetics mechanism (160), which stops the downward movement of the platform (330) and directs the sphere (125) into the sphere-sliding pipe (170). The kinetics mechanism (160) is shown in FIG. 1 in a dashed enclosure. Preferably, the striking platform (302) hits the hard rubber ball (164) on an end projecting off the platform (330), such projecting end is the end opposite the end with the spring hinge (333).

In operation, the striking platform (302) is a means to control rebound trajectory of the spheres (125). When the platform (330) is brought to a stop by the kinetics mechanism (160), the striking platform (302) rises up by pivoting from the spring hinge (333) and such action sends each of the spheres (125) towards the net (165). The spring hinge (333) then returns the striking platform (302) to its original horizontal position.

The apparatus (105) next includes a rotatable flywheel (140) that is operably connected to the platform (330) to rotate with movement of the platform (330) in response to an impact from each of the spheres (125).

The apparatus (105) next includes a sphere injector (245) configured to inject each of the spheres (125) into the first pipe (110) near the bottom end (112) of the first pipe (110).

The apparatus (105) next includes a sphere-lifting mechanism (150) configured near the top end (111) of the first pipe (110) and operable to move each of the spheres (125) into the second pipe (120), preferably one at a time.

The apparatus (105) may include a first rope (355) that is connected to the platform and rotatable flywheel (140) so as to impart angular momentum to, that is, to rotate, the rotatable flywheel (140) upon downward movement of the platform (330). The first rope (355) is wrapped around the hub (141) of the rotatable flywheel (140) and is attached to the platform (330) so as to unwind and spin the rotatable flywheel (140) when the platform (330) is sent in a downward direction by impact with any of the spheres (125). To enable an unobstructed view of the first rope (355) in FIG. 3, one of the four shafts (133) otherwise obscuring the first rope (355) is shown with the obscuring section above the platform (330) removed.

The apparatus (105) may include one or more rope-winding mechanisms, each comprising a spring-activated roller and a second rope. FIG. 3 shows a left-spring-activated roller (356a) with a left second-rope (359a); and a right-spring-activated roller (356b) with a right second-rope (359b).

Each second rope is wrapped around its spring-activated roller at one end and connected to the platform (330) at the other end. Each spring-activated roller tensions when its second rope unrolls with the downward movement of the platform (330). When the platform (330) is at the bottom of its movement, each second rope is fully extended and the spring-activated roller is poised to return the platform (330) to its pre-impact, original position (332).

Each rope-winding mechanism is, therefore, configured to engage upon movement of the platform (330) in response to an impact of any of the spheres (125), and hence to return the platform (330) to the original position (332) after such movement.

The sphere lifting mechanism (150) may include a pulley-disk (152) with radially-extending arm (191); a rotator mechanism (193); and, a third rope (158) connected between the pulley-disk (152) with radially-extending arm (191) and the rotator mechanism (193). The rotator mechanism (193) is preferably a linear actuator with a movable rod connected to the third rope (158) so that upward movement of the movable rod by action of an air pulse from the air line (181) pulls the third rope (158) and turns the pulley-disk (152) with radially-extending arm (191) about 45 degrees in rotation so as to preferably engage one of the spheres (125) in the first pipe (110) and lift it into the second pipe (120). After having moved up, the rod falls by action of gravity as does the pulley-disk (152) with radially-extending arm (191) when it returns to its pre-rotated position.

The rotator mechanism (193) is preferably connected to the actuator by an air line (181), but may be electrically or mechanically driven. The sphere-lifting mechanism (150) is shown in FIG. 1 in a dashed enclosure. Preferably, operability is coordinated when the rotator mechanism (193) is activated by pneumatic operation, which then turns the pulley-disk (152) with radially-extending arm (191). The pulley-disk (152) with radially-extending arm (191) may be configured with an additional weight pad at its centrally down point, which enables the pulley disk to return back to its original position when the actuator stops its activation. Preferably, the rotator mechanism (193) is configured to turn the pulley-disk (152) with radially-extending arm (191) in approximately 45 degree rotation so as to engage one of the spheres (125) in the first pipe (110) and lift it into the second pipe (120).

The apparatus (105) may include a kinetics mechanism (160) to collect each of the spheres (125) after impact with the platform (330). The kinetics mechanism (160) comprises an inside tubular mechanism (161); an outside tubular mechanism (162); a spring (163); a hard rubber ball (164); and a net (165).

The kinetics mechanism (160) first includes two co-axial hollow tubular members that are positioned approximately vertically in the apparatus (105). These two co-axial hollow tubular members include an inside tubular member (161) and an outside tubular member (162). The inside tubular member (161) includes an inside-tube top-end (166) and is configured such that the inside-tube top-end (166) extends out of the outside tubular member (162). The inside tubular member (161) is slidable with respect to the outside tubular member (162).

The kinetics mechanism (160) next includes a spring (163), which is in the form of an elongated coil that fits co-axially within the outside tubular member (162). The spring (163) is further configured to resist sliding of the inside tubular member (161), preferably when it compresses in response to the inside tubular member (161) moving to compress the spring (163).

The kinetics mechanism (160) next includes a hard rubber ball (164) that is positioned at the inside-tube top-end (166) of the inside tubular member (161).

The hard rubber ball (164) is configured to compress, that is soften the impact, upon engagement with the platform (330) after the platform (330) begins movement from the impact with any of the spheres (125).

The hard rubber ball (164) is further configured to cause the inside tubular member (161) to compress the spring (163) to stop movement of the platform (330). The hard rubber ball (164) is further configured to recoil to bounce the sphere off the platform. Thus, the two co-axial hollow tubular members and the hard rubber ball (164) must be positioned within the apparatus (105) for engagement with the platform (330) so that they can stop movement of the platform (330), and so that the platform (330) can be then returned to its original position (332) for impact with the next sphere.

The kinetics mechanism (160) next includes a net (165) configured to intercept each of the spheres (125) after a sphere bounces off, or rebounds, from the platform (330). The net (165) is shown in FIG. 1 and FIG. 4, positioned to receive the sphere upon rebound from the platform (330). The net (165) is further configured to direct, or funnel, the intercepted spheres (125) into a sphere-sliding pipe (170). The sphere-sliding pipe (170) is configured to receive the spheres (125) and allow their downward passage to the sphere injector (245).

The apparatus (105) that includes a kinetics mechanism (160) may include a sphere injector (245) that includes a ball-valve (175) and an actuator (180) to turn the ball-valve (175). The ball-valve (175) may be operated pneumatically, electrically, or manually.

Figure 2:
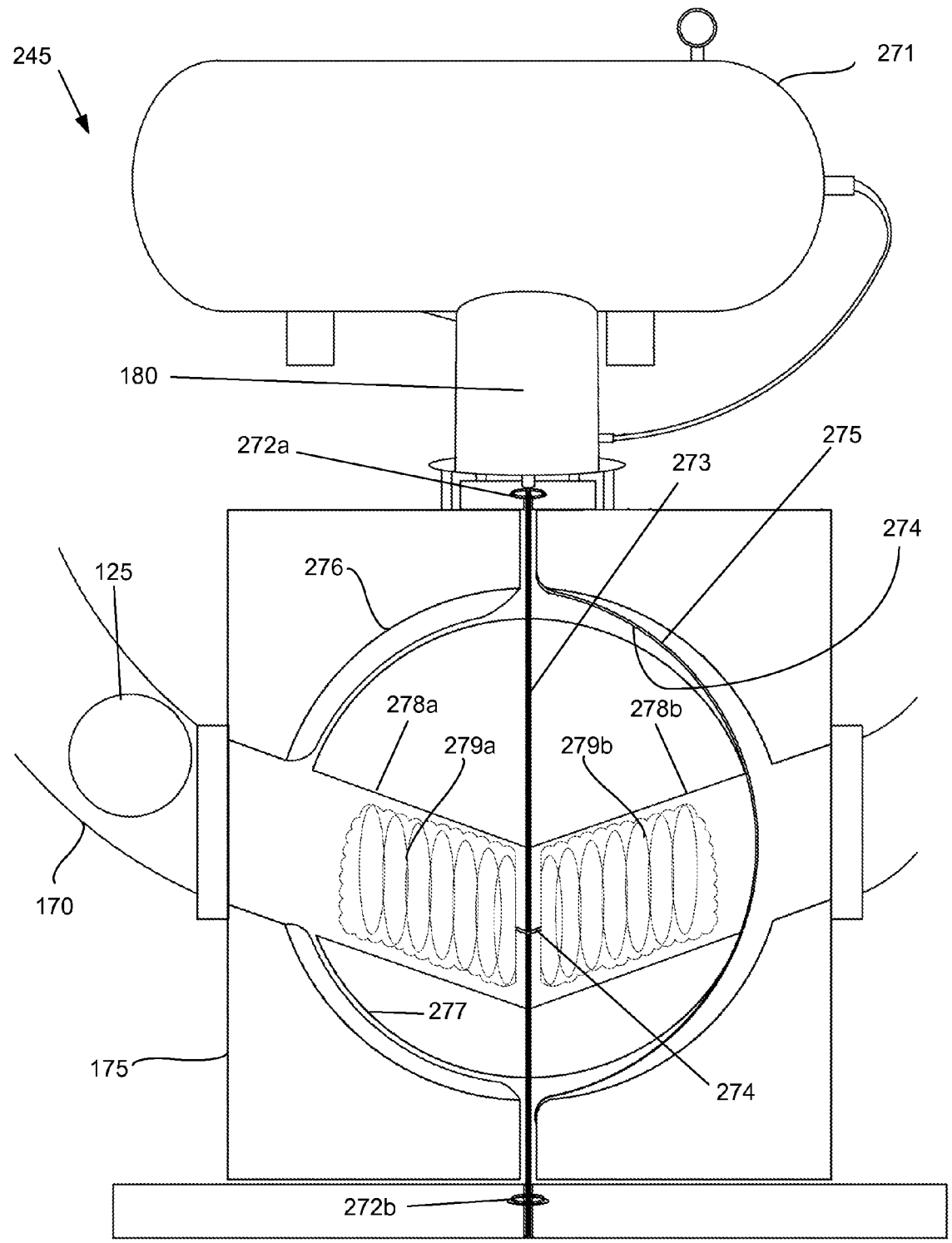
FIG. 2 is a front sectional elevation view of the ball-valve.

FIG. 2 shows a ball-valve (175) that is pneumatic in that an air compressor (271) sits atop the ball-valve (175) and operates the actuator (180) by providing air pressure. Two bearings, a top bearing (272a) and a bottom bearing (272b), enable the ball-valve (175) to turn around an air-axis pipe (273) that is centrally disposed in the valve to assist in operability of the ball-valve (175).

The air-axis pipe (273) preferably comprises a hollow shaft serving as the turning axis or axle of the ball-valve (175) and also serving as a pipe through which air may be conveyed to a left-inflatable spring (279a) and a right-inflatable spring (279b).

The ball-valve (175) in the sphere injector (245) includes a casing (276) surrounding an inner-rotatable ball (277). Instead of a hollow passage as in most ball-valves, the inner-rotatable ball (277) has at least one, but preferably two, downwardly slanting chambers: a left-downwardly-slanting chamber (278a) and a right-downwardly-slanting chamber (278b). These two downwardly slanting chambers are preferably at diametrically opposing sides of the inner-rotatable ball (277). These downwardly slanting chambers are isolated from each other, except through an air vent (274). They are configured to align with the exit of the sphere-sliding pipe (170) and to the inlet to the first pipe (110), respectively. When one downwardly slanting chamber is used, for example using either a left-downwardly-slanting chamber (278a) or a right-downwardly-slanting chamber (278b), then it is configured to rotate to connect with either the sphere-sliding pipe (170) or the first pipe (110).

The downwardly slanting chambers are in a slanting position so as to align them with the exit of the sphere-sliding pipe (170) and the inlet to the first pipe (110). They are preferably right-circular cylindrical volumes of a diameter and depth sufficient to hold at least one of the spheres (125) such that this sphere can enter the left-downwardly-slanting chamber (278a) from the sphere-sliding pipe (170) and then be rotated to the first pipe (110).

When two downwardly slanting chambers are used in the kinetics mechanism (160), after such rotation, the right-downwardly-slanting chamber (278b) would be simultaneously rotated into position connecting with the sphere-sliding pipe (170). The ball-valve (170) may be configured for 180 degree back-and-forth rotation, or for 360-degree, one-angular-direction, circular rotation.

The actuator (180) in the kinetics mechanism (160) is preferably configured for pneumatic activation to turn the inner-rotatable ball (277) between the sphere-sliding pipe (170) and the first pipe (110). A hand wheel or other mechanical or electrical activation are alternatives.

The actuator (180) is preferably configured for pneumatic operation and is shown in FIG. 1 and FIG. 2 connected to an air compressor (271), which preferably is activated by electricity produced by the apparatus (105). Optionally, the actuator (180) may be interconnected to activate with movement of platform (330). The actuator (180) is further configured for adjustment to the desired torque range, output speed, and automation to match the settings needed for the intended energy production from the apparatus (105).

Each downwardly slanting chamber may also include an inflatable spring. FIG. 2 illustrates a left-inflatable spring (279a) in the left-downwardly-slanting chamber (278a) and a right-inflatable spring (279b) in the right-downwardly-slanting chamber (278b). Each inflatable spring compresses when a plurality of spheres (125) act on the left-inflatable spring (279a) by gravity and both are interconnected by an air vent (274), which enables the flow of air from one side to the other. Air flows when one of the spheres (125) compresses the left-inflatable spring (279a) and pushes air out through the air vent (274) to pressurize the right-downwardly-slanting chamber (278b) and give an extra push to eject a sphere into the first pipe (110).

Preferably, the ball-valve (175) includes a resilient sheet (275) between the casing (276) and the inner-rotatable ball (277). The resilient sheet (275) resists unintended flow of water through the ball-valve (175) under high pressures experienced in normal operation. The ball-valve (175) also includes a low-friction liner (274), under and immediately adjacent to the resilient sheet (275) to minimize ball-valve turning resistance during operation. A preferable low-friction liner (274) is a polytetrafluoroethylene layer, which is a well known synthetic fluoropolymer.

In operation using a plurality of spheres (125), a first sphere would momentarily sit in the left-downwardly-slanting chamber (278a) and a second sphere would momentarily sit in the right downwardly slanting chamber (278b). The first sphere is effectively at the bottom end of a row of spheres (125) in the sphere-sliding pipe (170). That first sphere having entering into the left-downwardly-slanting chamber (278a) by action of gravity, compresses the left-inflatable spring (279a) at the bottom of the left-downwardly-slanting chamber (278a). Air from the left-inflatable spring (279a) flows to the right-inflatable spring (279b) through the air vent (274) and ejects the sphere in the right-downwardly-slanting chamber (278b) into the first pipe (110). Buoyant forces also acting on the sphere cause the sphere to rise in the first pipe (110). The actuator (180) then turns the inner-rotatable ball (277) 180 degrees to connect to the first pipe (110) and another one of the spheres (125) enters the left-downwardly slanting chamber (278a). If multiple downward slanting chambers are used, the action would be very much like a revolver chamber where it rotates a sufficient distance to load the next bullet into a gun's chamber.

The air vent (274) preferably includes an air-inlet connection to the air-axis pipe (273), which permits unimpeded expansion of the right-inflatable spring (279b) freely by allowing outside air to enter. The inflatable springs preferably occupy the volume of liquid displaced by a sphere and, thus, minimize the outflow of liquid (115) from the left-downwardly slanting chamber (278a) to the sphere sliding pipe (170) when one of the spheres (125) enters into first pipe (110).

Figure 7:
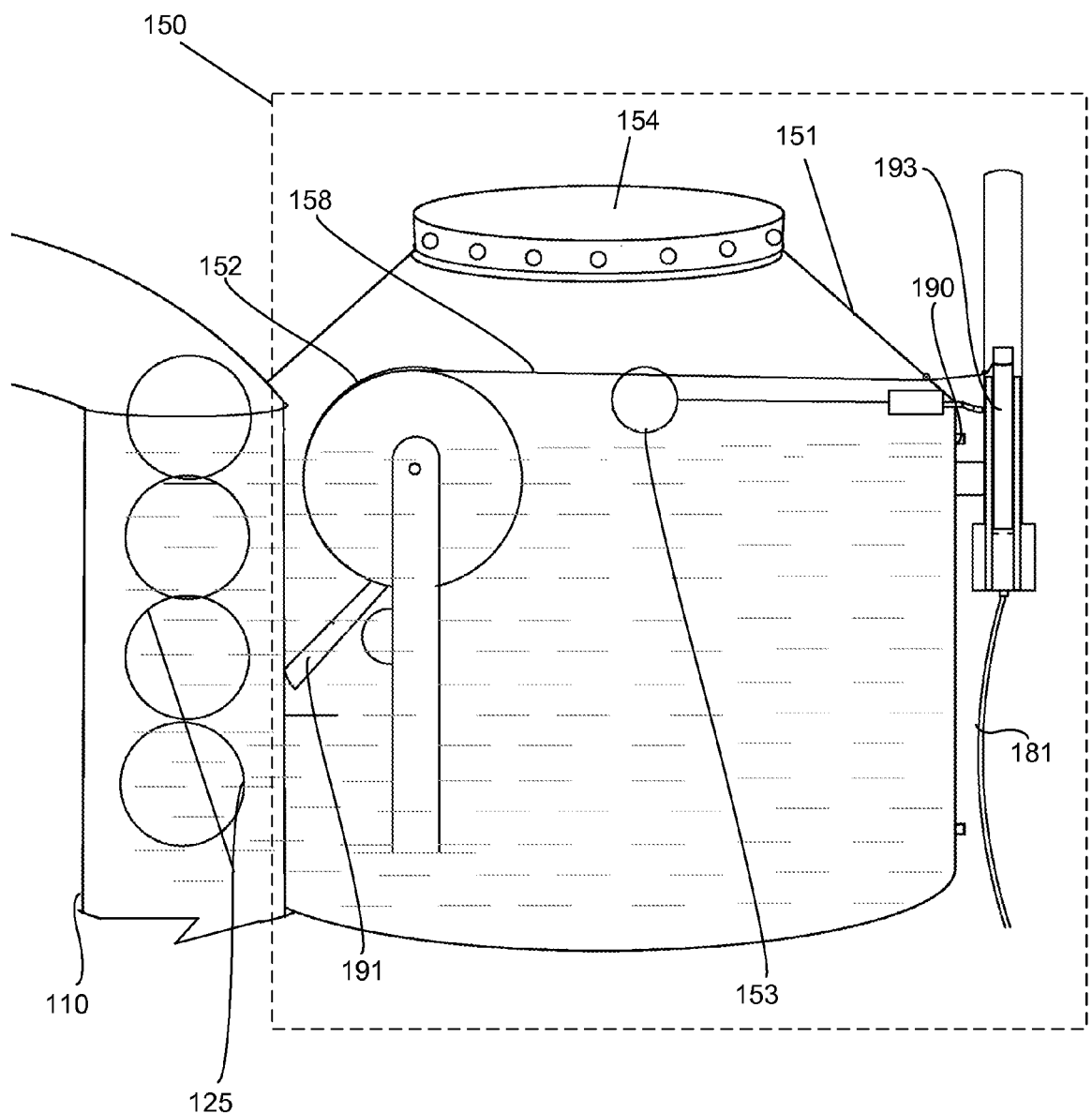
FIG. 7 is a front sectional elevation view of the sphere-lifting mechanism.

The sphere-lifting mechanism (150) in the apparatus (105) preferably includes a tank (151) flowably connected with the liquid (115) that fills the first pipe (110) near the top end (111) of the first pipe (110). Details of the sphere-lifting mechanism are also shown in FIG. 7.

The tank (151) is filled with the liquid (115) and preferably includes a float valve (153) to control the level of liquid (115). Since the tank (151) and the first pipe (110) are flowably connected with the liquid (115), the liquid (115) is at same level in the first pipe (110) and the tank (151).

The tank (151) further includes a lid (154), or cover. The lid (154) is preferably perforated on its sides to enable air to flow in and out with the operation of the sphere injector (245), sphere-lifting mechanism (150) and float valve (153).

The float valve (153) is essentially the mechanism controlling liquid inflow into the apparatus (105). An overflow port (190) is provided on the side of the tank (151) in line with required liquid (115) level. Preferably, a float valve inlet port is flowably connected to a make-up liquid tank (192). The make-up liquid tank (192) enables the addition of liquid (115) as required by action of the float valve (153). By the mutual function of float valve (153), overflow port (190), and the make-up liquid tank (192) the level of the liquid (115) remains constant in the tank (151) and the first pipe (110).

This sphere-lifting mechanism (150) further includes a pulley-disk (152) with a radially-extending arm (191). The pulley-disk (152) is configured to rotate its radially-extending arm (191) into the first pipe (110) to individually engage each of the spheres (125) at the top end of the first pipe (110) to move that sphere into the inbound end (121) of the second pipe (120).

Each of the spheres (125) rises to the top end (111) due to buoyancy forces acting on the sphere. When a plurality of spheres (125) is used, each additional sphere stacks up immediately below the sphere above it. This is because the diameter of first pipe (110) is preferably large enough for only one ball in the horizontal direction.

The pulley-disk (152) with a radially-extending arm (191) may be made of any suitable material, such as for example plastic or wood. The pulley-disk (152) with a radially-extending arm (191) is preferably configured to rotate in a plane perpendicular to the horizon so that its radially-extending arm (191) rises and falls in a vertical direction with rotation, preferably a 45 degree rotation.

Figure 5:
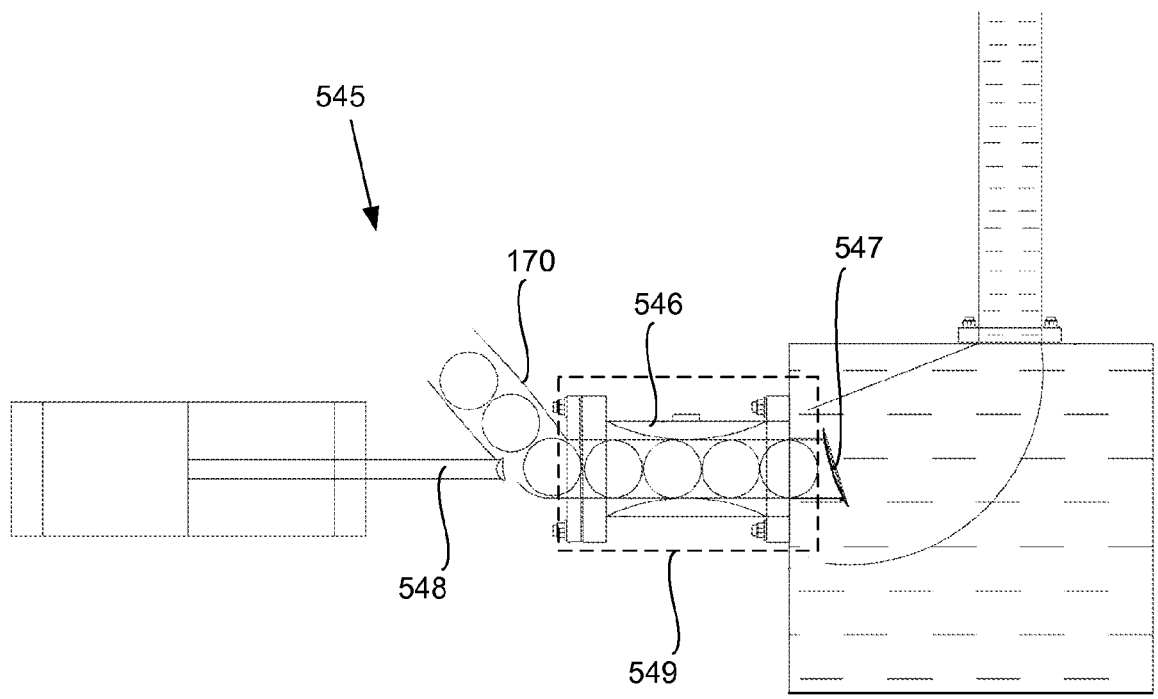
FIG. 5 is a front sectional elevation view of an alternative sphere injector.

In an alternative embodiment, the sphere injector (545) includes a sphere-sliding pipe (170). The sphere-sliding pipe (170) is configured to enable downward passage of each of the spheres (125) toward the first pipe (110) and the sphere injector (545). The sphere-sliding pipe (546) comprises an approximate horizontal segment (549) flowably connected to the first pipe (110). The horizontal segment (549) is shown in FIG. 5 in a dashed enclosure.

In this embodiment, the sphere injector (545) preferably further includes a flap (547) operable to close off the sphere-sliding pipe (546) from the first pipe (110). The flap (547) is preferably biased to the closed position by spring action.

In this embodiment, the sphere injector (545) preferably further includes a valve (546) within the horizontal segment (549) operable to prevent back flow of the liquid (115) from the first pipe (110) while the sphere is within the valve (546).

In this embodiment, the sphere injector (545) preferably further includes a rod (548) operable to push each of the spheres (125) through the valve (546) and into the first pipe (110). Component operability in this embodiment is preferably enabled by electrical or pneumatic means.

Figure 6:
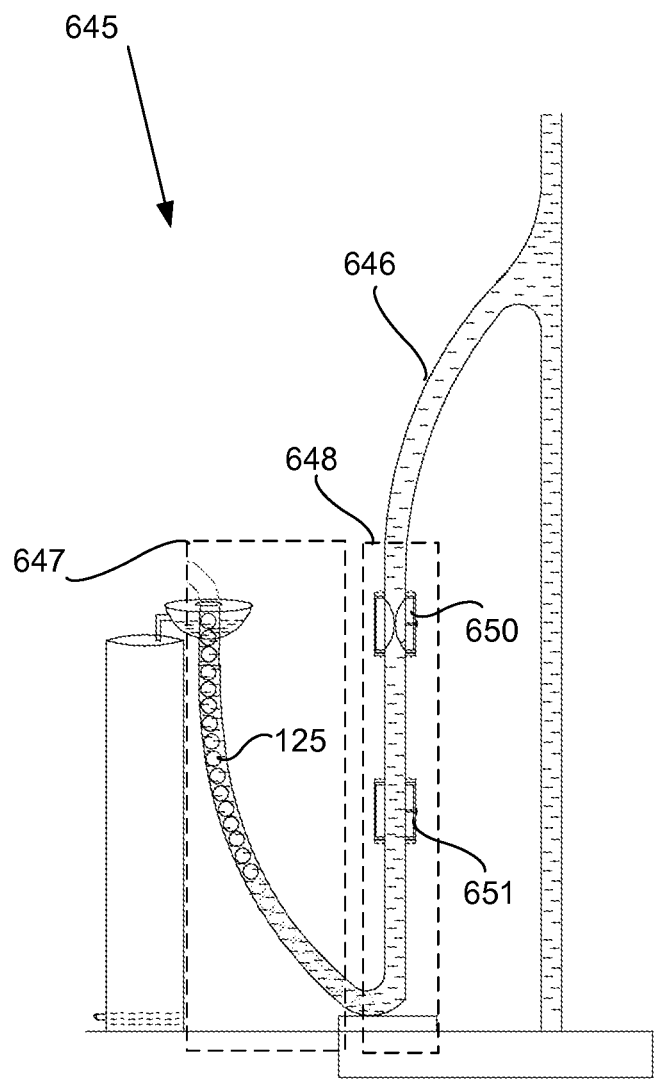
FIG. 6 is a front sectional elevation view of another alternative sphere injector.

In another alternative embodiment, the sphere injector (645) preferably includes an extension pipe (646) of a diameter sufficient for flowing a sphere through it. The extension pipe (646) includes a left-side vertical segment (647) and a right-side vertical segment (648), which are shown in FIG. 6 in the dashed enclosures. The extension pipe (646) includes a left-side vertical segment (647) and a right-side vertical segment (648) that are joined together in an approximate "U" shape wherein the right-side vertical segment (648) is flowably connected to the first pipe (110) and the left-side vertical segment (647) is configured to receive each of the spheres (125) after the sphere's impact with the platform (330).

The sphere injector (645) in the apparatus (105) preferably further includes two valves comprising an upper valve (650) and a lower valve (651). These valves are positioned one above the other in the right-side vertical segment (648) and spaced apart by at least the diameter of one sphere. These two valves are configured for normal operation such that both the upper valve (650) and the lower valve (651) may not be opened to the flow of any of the spheres (125) or liquid (115) at the same time.

The sphere injector (645) in the apparatus (105) preferably further includes the liquid (115) approximately filling the extension pipe (646) to the level of the upper valve (650).

EXAMPLE 1

Flow of Spheres

Using the embodiment shown in FIG. 1, the platform (330) is positioned approximately horizontally where it will intercept each of the vertically falling spheres (125). When each of the falling spheres (125) impacts the platform (330), the platform (330) is preferably designed to move vertically downward. Since the platform (330) is connected to the rotatable flywheel (140) by a rope (355), the vertically downward movement of the platform (330) rotates the rotatable flywheel (140), which in turn may be used to turn a generator for electric power generation.

The vertically downward movement of the platform (330) is stopped by the kinetics mechanism (160), which is preferably erected at ground level. It is then returned to its original position (332) by the left-spring-activated roller (356a) and the right-spring-activated rollers (356b).

In the resulting recoil of any of the spheres (125) after impact with the platform (330), each such sphere rebounds towards the net (165). The net (165) funnels each of the spheres (125) into the sphere-sliding pipe (170), where the spheres (125) slide under the influence of gravity towards the sphere injector (245), which, in this case, uses a ball-valve (175) adapted for this use. The ball-valve (175) has a left-downwardly-sloping chamber (278a) located at the exit of the sphere-sliding pipe (170) where each of the spheres (125) comes to rest. Once any of the spheres (125) is within the left-downwardly-sloping chamber (278a), the ball-valve (175) rotates by action of an actuator (180). The actuator (180) is preferably operably connected to an air compressor (271) and alternatively to an electrical power supply or mechanically operated control. Upon 180 degree rotation, the left-downwardly-sloping chamber (278a) enters into alignment with the first pipe (110).

Due to buoyancy, each of the spheres (125) then rises up to the top end (111) of the first pipe (110), which is near the surface level of the liquid in the first pipe (110). This rise occurs irrespective of the height of the surface of the liquid (115) in the first pipe (110).

Each of the spheres (125) is then moved to the second pipe (120) by the sphere-lifting mechanism, where it then repeats the cycle. Preferably, multiple spheres (125) are used so that when the platform (330) is returned to its original position (332), another one immediately impacts it. Therefore, with a minimum of delay, after the first sphere hits the platform, the second one makes the impact and so on. In this manner, once the process starts, the steps of processes continue without any break and hence the electricity is generated more or less continuously.

Preferably, the apparatus (105) includes an outlet valve (135), which is connected to the first pipe (110) near ground level to drain out the liquid for maintenance or other reasons.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the electricity and energy production industries.

What is claimed is:

1. An apparatus for the production of energy employing buoyancy, gravity and kinetic energy, the apparatus comprising,
    a first pipe comprising a top end and a bottom end, and configured approximately vertically with the top end at a height above ground level;
    a liquid filling the first pipe;
    a plurality of spheres that are hollow, each such sphere configured:
        to fit within the first pipe; and,
        to have a weight less than the weight of a volume of the liquid displaced by a sphere in the plurality of spheres when the sphere is submerged within the liquid;
    a second pipe comprising an inbound end and an outbound end, the inbound end flowably connected to the first pipe near the top end of the first pipe and the outbound end configured to allow downward passage of a sphere in the plurality of spheres through the second pipe to exit the outbound end;
    a platform comprising an approximately planar surface, the platform configured:
        in an original position to be impacted on the approximately planar surface by the sphere exiting the outbound end of the second pipe;
        for movement in response to the impact of such sphere; and,
        to stop and then return by spring action to the original position after such movement;
    a rotatable flywheel operably connected to the platform to rotate with movement of the platform in response to such impact;
    a sphere injector configured to inject a sphere into the first pipe near the bottom end of the first pipe; and,
    a sphere-lifting mechanism configured near the top end of the first pipe and operable to move a sphere into the second pipe.

2. The apparatus of claim 1, further comprising a first rope connected to the platform and rotatable flywheel and configured to rotate the rotatable flywheel upon downward movement of the platform.

3. The apparatus of claim 1, further comprising a rope-winding mechanism comprising:
    a spring-activated roller;
    a second rope, wherein the second rope is wrapped around the spring-activated roller and connected to the platform; and,
    wherein, the rope-winding mechanism is configured to engage upon movement of the platform in response to an impact of the sphere, and hence to return the platform to the original position after such movement.

4. The apparatus of claim 1, wherein the sphere-lifting mechanism comprises:
    a pulley-disk with radially-extending arm;
    a rotator mechanism; and,
    a third rope connected between the pulley disk with radially-extending arm and the rotator mechanism;
    wherein the rotator mechanism is configured to turn the pulley-disk with radially-extending arm in approximately 45 degree rotation so as to engage one of the spheres in the first pipe and lift it into the second pipe.

5. The apparatus of claim 1, further comprising a kinetics mechanism to collect spheres after impact with the platform, the kinetics mechanism comprising:
    two co-axial hollow tubular members comprising an inside tubular member and an outside tubular member, wherein:
        the inside tubular member comprises a top end that extends out of the outside tubular member
        the inside tubular member is configured to be slidable with respect to the outside tubular member;
        the two co-axial hollow tubular members are positioned approximately vertically.
    a spring comprising a coil configured to fit within the outside tubular member and resist sliding of the inside tubular member;
    a hard rubber ball positioned at the top of the inside tubular member and configured to:
        compress upon engagement with the platform after the platform begins movement from the impact;
        cause the inside tubular member to compress the spring to stop movement of the platform; and
        recoil to bounce the sphere off the platform; and,
    a net configured to intercept the sphere after the bounce off the platform and direct the sphere into a sphere-sliding pipe configured to receive the sphere and allow downward passage of the sphere to the sphere injector.

6. The apparatus of claim 5, wherein the sphere injector comprises:
    a ball-valve, the ball-valve comprising:
        a casing; and,
        an inner-rotatable ball comprising a downwardly slanting chamber configured to rotate to connect with either the sphere-sliding pipe or the first pipe; and,
    an actuator configured to turn the inner-rotatable ball between the sphere-sliding pipe and the first pipe.

7. The apparatus of claim 1, wherein the sphere-lifting mechanism comprises:
    a tank flowably connected with the liquid filling the first pipe near the top end of the first pipe; and,
    a pulley-disk with a radially-extending arm, the pulley-disk configured to rotate the radially-extending arm into the first pipe to engage the sphere at the top end of the first pipe to move the sphere into the inbound end of the second pipe.

8. The apparatus of claim 1, wherein the sphere injector comprises:
    an extension pipe of a diameter sufficient for flowing a sphere through it, the extension pipe comprising a left-side vertical segment and a right-side vertical segment joined together in an approximate "U" shape wherein the right-side vertical segment is flowably connected to the first pipe and the left-side vertical segment is configured to receive the sphere after its impact with the platform;

two valves comprising an upper valve and a lower valve positioned one above the other in the right-side vertical segment and spaced apart by at least the diameter of one sphere and configured for normal operation such that both the upper valve and the lower valve may not be opened at the same time; and, the liquid approximately filling the extension pipe to the level of the upper valve.

9. The apparatus of claim 1, wherein the sphere injector comprises:

a sphere-sliding pipe configured to enable downward passage of a sphere toward the first pipe, the sphere-sliding pipe comprising an approximate horizontal segment flowably connected to the first pipe;

a flap operable to close off the sphere-sliding pipe from the first pipe.

a valve within the horizontal segment operable to prevent back flow of the liquid from the first pipe while the sphere is within the valve; and, a rod operable to push the sphere through the valve and into the first pipe.

10. The apparatus of claim 1, further comprising:

a striking platform configured to impact with the hard rubber ball of the kinetics mechanism upon downward movement of the platform; and, a spring hinge configured to:
enable upward rotation of the striking platform; and,
return the striking platform to the horizontal position.

* * * * *